(12) United States Patent
Kim et al.

(10) Patent No.: US 10,451,914 B2
(45) Date of Patent: Oct. 22, 2019

(54) DISPLAY DEVICE

(71) Applicant: Samsung Display Co., Ltd., Yongin-si, Gyeonggi-do (KR)

(72) Inventors: Tae Woo Kim, Seoul (KR); Jung Gun Nam, Suwon-si (KR); Gug Rae Jo, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/817,363

(22) Filed: Nov. 20, 2017

(65) Prior Publication Data

US 2018/0356678 A1 Dec. 13, 2018

(30) Foreign Application Priority Data

Jun. 7, 2017 (KR) .................. 10-2017-0070836

(51) Int. Cl.
*H01L 27/32* (2006.01)
*G02F 1/1335* (2006.01)
*G02F 1/1368* (2006.01)

(52) U.S. Cl.
CPC .. *G02F 1/133516* (2013.01); *G02F 1/133528* (2013.01); *G02F 1/1368* (2013.01); *G02F 2001/133519* (2013.01); *G02F 2001/133548* (2013.01); *G02F 2202/023* (2013.01); *G02F 2202/108* (2013.01); *G02F 2202/36* (2013.01)

(58) Field of Classification Search
CPC . H01L 27/32; H01L 27/3258; H01L 27/3211; H01L 27/322
See application file for complete search history.

(56) References Cited

U.S. PATENT DOCUMENTS 6,288,840 B1 9/2001 Perkins et al.
2015/0205159 A1* 7/2015 Itou .................. G02F 1/133514
349/110

FOREIGN PATENT DOCUMENTS

KR  1020130000756 A  1/2013
KR  1020150047357 A  5/2015

* cited by examiner

*Primary Examiner* — Jae Lee
(74) *Attorney, Agent, or Firm* — Cantor Colburn LLP

(57) ABSTRACT

A display device includes: a thin film transistor array panel through which an incident light passes; and a color conversion display panel from which wavelength-converted incident light is emitted to display an image, the color conversion display panel including: a substrate facing the thin film transistor array panel; and between the second substrate and the thin film transistor array panel: color conversion patterns which each wavelength-converts the incident light passed through the thin film transistor array panel, and a transmission pattern which transmits the incident light passed through the thin film transistor array panel; a polarization layer disposed respectively between the thin film transistor array panel, and each of the color conversion and transmission pattern; and an imprint resin layer disposed respectively between the polarization layer, and each of the color conversion and transmission pattern, the imprint resin layer defining an uneven surface thereof facing the polarization layer.

19 Claims, 12 Drawing Sheets

DISPLAY DEVICE

This application claims priority to Korean Patent Application No. 10-2017-0070836 filed on Jun. 7, 2017, and all the benefits accruing therefrom under 35 U.S.C. § 119, the content of which in its entirety is herein incorporated by reference.

BACKGROUND (a) Field

The present disclosure relates to a display device.

(b) Description of the Related Art

A liquid crystal display used as a display device to display an image with light may include two (electric) field generating electrodes, a liquid crystal layer, a color filter and a polarization layer. Light leakage may be generated in a color filter and a polarization layer of the display device.

A display device including a color conversion display panel including semiconductor nanocrystals such as quantum dots has been proposed in order to reduce a loss of light generated from a polarizing layer or the like and to realize a display device having a relatively high color reproduction rate.

SUMMARY

Exemplary embodiments described in the present specification provide a color conversion layer, an imprint resin layer which covers the color conversion layer and has a flat surface, and a polarization layer disposed facing the flat surface of the imprint resin layer. The exemplary embodiments have also been made in an effort to control reliability of a color conversion display panel and a display device including such display panel and to improve display quality and color reproducibility. The technical objects to be achieved by the invention are not limited to the aforementioned technical objects, and other unmentioned technical objects will be obviously understood by those skilled in the art from the description below.

An exemplary embodiment of the invention provides a display device including: a thin film transistor array panel through which an incident light passes, the thin film transistor array panel including a thin film transistor disposed on a first substrate; and a color conversion display panel from which wavelength-converted incident light is emitted to display an image, the color conversion display panel including: a second substrate facing the first substrate; and between the second substrate and the thin film transistor array panel: a plurality of color conversion patterns which each wavelength-converts the incident light passed through the thin film transistor array panel and a transmission pattern which transmits the incident light passed through the thin film transistor array panel; a polarization layer which polarizes the incident light passed through the thin film transistor array panel, the polarization layer disposed respectively between the thin film transistor array panel, and each of the plurality of color conversion patterns and the transmission pattern; and an imprint resin layer disposed respectively between the polarization layer, and each of the color conversion patterns and the transmission pattern, the imprint resin layer defining an uneven surface thereof facing the polarization layer.

The display device may further include a first overcoat layer disposed between the imprint resin layer and each of the color conversion patterns, and between the transmission pattern and the imprint resin layer.

A surface of the first overcoat layer may face the imprint resin layer, the surface including a step having a height of about 40 nanometers (nm) or more.

The uneven surface of the imprint resin layer may be defined by a plurality of convex and concave portions alternated with each other, and distal end surfaces of the convex portions are disposed in a same plane as each other to define a planar surface of the imprint resin layer which faces the polarization layer.

The color conversion patterns may include a first color conversion pattern and a second color conversion patterns adjacent to each other in a first direction, the first color conversion pattern, the second color conversion pattern and the transmission pattern may be sequentially disposed spaced apart from each other in the first direction, a valley may be respectively formed between the first color conversion pattern and the second color conversion pattern spaced apart from each other, and between the second color conversion pattern and the transmission pattern spaced apart from each other, and the valley lengthwise extends in a second direction crossing the first direction.

The uneven surface of the imprint resin layer may be defined by a plurality of convex and concave portions repeatedly alternated with each other in the second direction.

The uneven surface of the imprint resin layer maybe defined by a plurality of convex and concave portions repeatedly alternated with each other, and a direction in which the plurality of convex and concave portions are repeatedly alternated with each other is parallel with a direction in which the valley is lengthwise extended.

The uneven surface of the imprint resin layer may be defined by a plurality of convex and concave portions repeatedly alternated with each other at a pitch of about 200 nm or less.

The display device may further include a second overcoat layer disposed between the imprint resin layer and the polarization layer, and the second overcoat layer may define an uneven surface thereof facing the polarization layer, the uneven surface of the second overcoat layer including a step having a height of less than about 40 nm.

The second overcoat layer may include an inorganic material.

The imprint resin layer may include an ultraviolet ("UV") curable resin.

An exemplary embodiment of the invention provides a display device including: a thin film transistor array panel through which an incident light passes, the thin film transistor array panel including a thin film transistor; and a color conversion display panel from which wavelength-converted incident light is emitted to display an image, the color conversion display panel facing the thin film transistor array panel. The color conversion display panel includes: a substrate; and between the substrate and the thin film transistor array panel: a pattern layer including: a color conversion pattern which wavelength-converts the incident light passed through the thin film transistor array panel, and a transmission pattern which transmits the incident light passed through the thin film transistor array panel; a polarization layer which polarizes the incident light passed through the thin film transistor array panel, the polarization layer disposed respectively between the thin film transistor array panel, and each of the color conversion pattern and the transmission pattern; and an imprint resin layer including an optically curable resin. The imprint resin layer including the optically curable resin is disposed respectively between the polarization layer, and each of the color conversion pattern and the transmission pattern.

The color conversion pattern and the transmission pattern may be spaced apart from each other along the substrate to define a valley therebetween, and the imprint resin layer including the optically curable resin disposed respectively between the polarization layer, and each of the color conversion pattern and the transmission pattern, further includes: a first region overlapping the color conversion pattern and the transmission pattern; and a second region overlapping the valley between the color conversion pattern and the transmission pattern.

The imprint resin layer including the optically curable resin disposed respectively between the polarization layer, and each of the color conversion pattern and the transmission pattern, may further include: a base portion disposed in each the first and second regions; and a pattern portion commonly protruded towards the polarization layer from a same surface of the base portion, and a height of the pattern portion may be constant.

The height of the pattern portion may be about 100 nm or less.

A height of the base portion disposed in the first region may be smaller than that of the base portion disposed in the second region.

Distal ends of the pattern portion disposed in the first region and distal ends of the pattern portion disposed in the second region may be disposed in a same plane as each other.

The display device may further include a first overcoat layer respectively between the imprint resin layer, and each of the color conversion pattern and the transmission pattern. The first overcoat layer may define an uneven surface thereof facing the polarization layer, the uneven surface of the first overcoat layer including a step having a height of about 40 nm.

The display device may further include a second overcoat layer disposed between the imprint resin layer and the polarization layer, and the second overcoat layer may define an uneven surface thereof facing the polarization layer, the uneven surface of the second overcoat layer including a step having a height of less than about 40 nm.

According to one or more of the exemplary embodiments, a flat surface may be provided by the imprint resin layer which covers the color conversion layer and the transmission layer. Accordingly, the polarization layer disposed on the flat surface of the imprint resin layer can be formed in a regular pattern. Therefore, improving reliability and display quality of the color conversion display panel and the display device is possible, since the polarization layer is formed in a regular pattern within the display panel.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
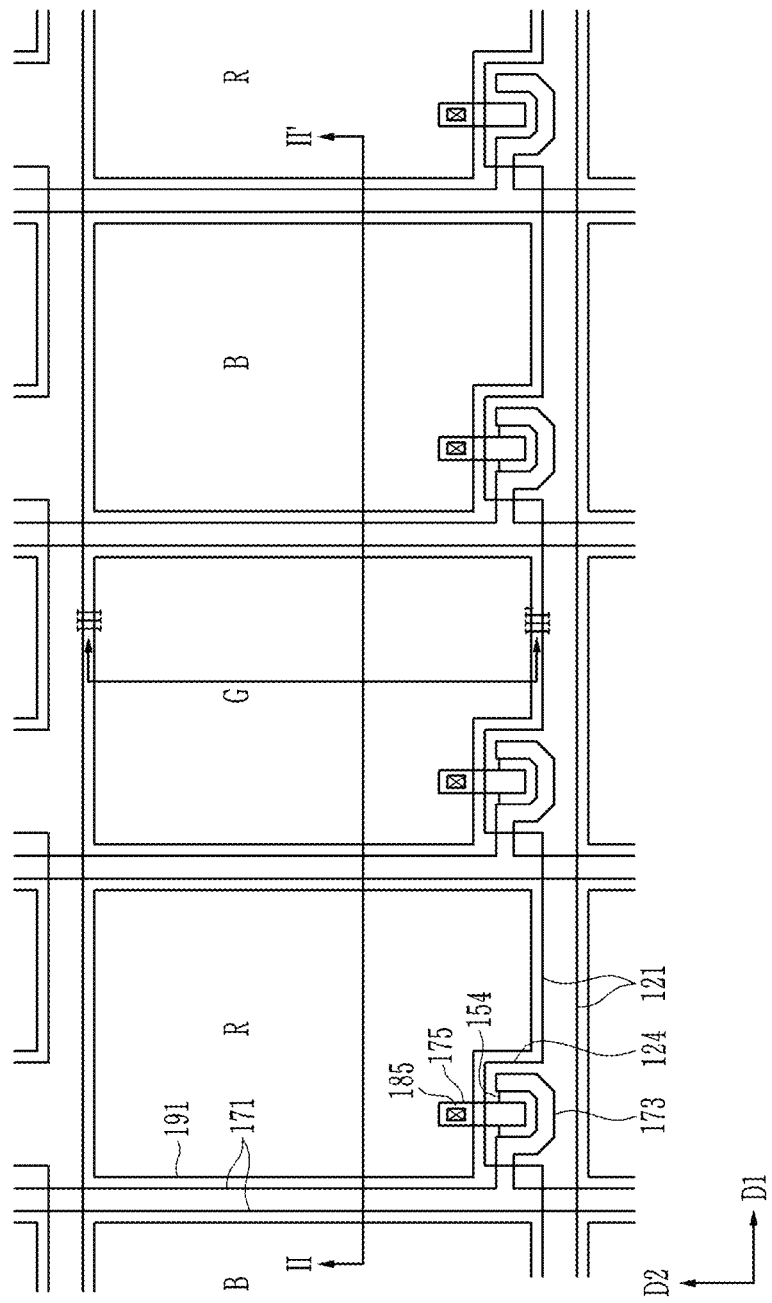
FIG. 1 is a top plan view illustrating an exemplary embodiment of a plurality of pixels of a display panel according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

To clearly describe the invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being related to another layer, film, region, or substrate such as being "on" another element, it can be directly on the other element or intervening elements may also be present. In contrast, when an element is referred to as being related to another layer, film, region, or substrate such as being "directly on" another element, there are no intervening elements present. Further, the word "over" or "on" means positioning on or below the object portion, and does not essentially mean positioning on the upper side of the object portion based on a gravity direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise.

"At least one" is not to be construed as limiting "a" or "an." "Or" means "and/or." As used herein, the term "and/or" includes any and all combinations of one or more of the associated listed items. In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above, and the phrase "in a cross-section" means when a cross-section taken by vertically cutting an object portion is viewed from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an exemplary embodiment of a display device according to the invention will be described with reference to FIG. 1 to FIG. 3. FIG. 1 is a top plan view illustrating an exemplary embodiment of a plurality of pixels of a display panel according to the invention, FIG. 2 is a cross-sectional view taken along line II-II' of FIG. 1, and FIG. 3 is a cross-sectional view taken along line III-III' of FIG. 1.

Figure 2:
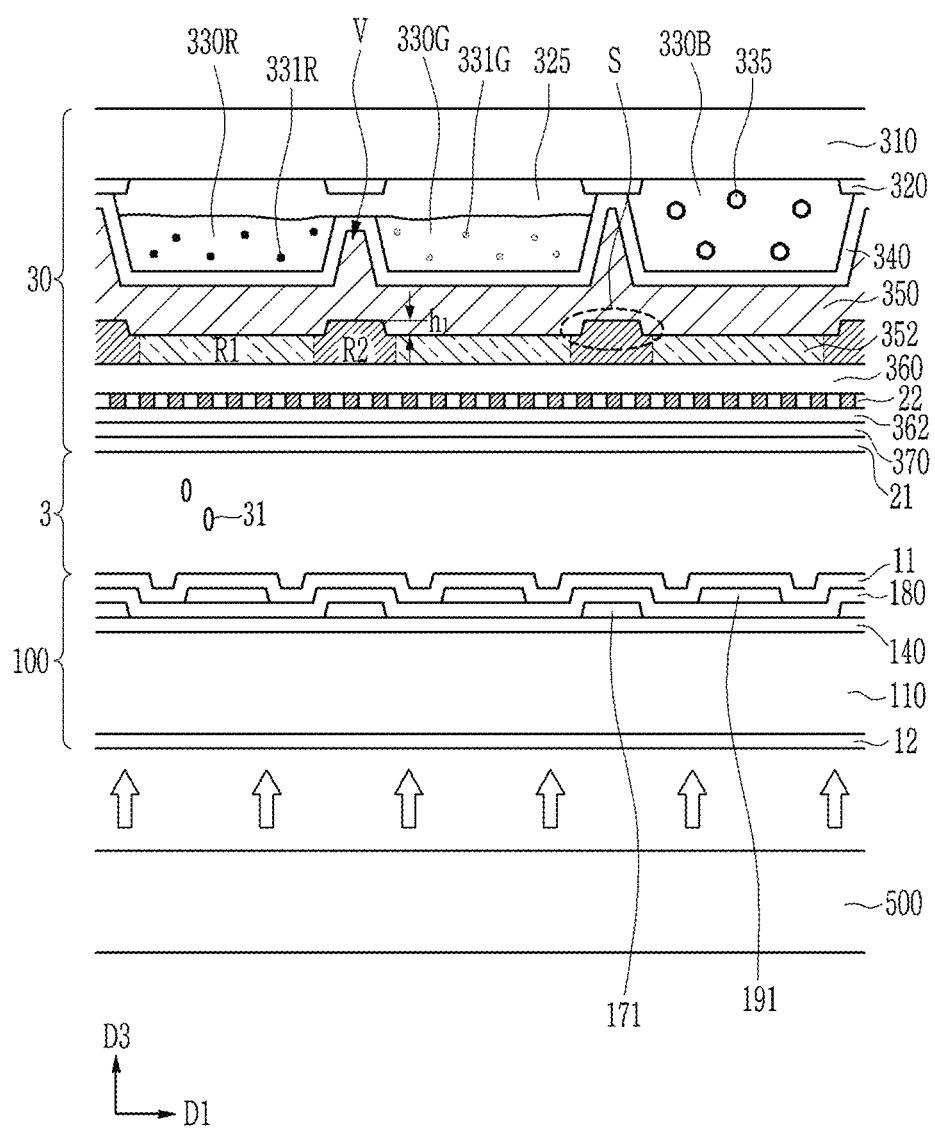
FIG. 2 is a cross-sectional view taken along line II-II' of FIG. 1.
Figure 3:
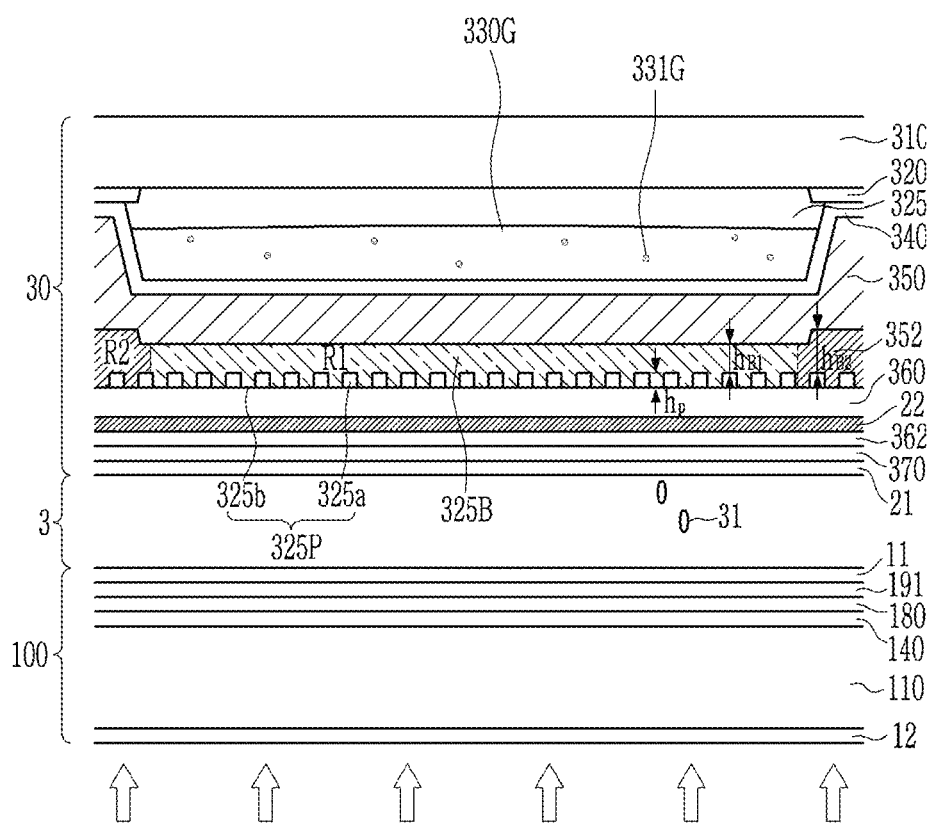
FIG. 3 is a cross-sectional view taken along line III-III' of FIG. 1.

Referring to FIG. 1 to FIG. 3, the display device according to the present exemplary embodiment includes a light unit 500, a lower display substrate such as a thin film transistor array panel 100, a color conversion display panel 30 separately disposed to face the thin film transistor array panel 100, and an optical medium or transmittance layer such as a liquid crystal layer 3 disposed between the thin film transistor array panel 100 and the color conversion display panel 30.

The light unit 500 may include a light source disposed at a rear surface of the thin film transistor array panel 100 to generate and emit light, and a light guide (not illustrated) disposed to receive the generated light and to guide the received light toward the thin film transistor array panel 100 and the color conversion display panel 30. The light guide may be disposed between the light unit 500 and the thin film transistor array panel 100, but the invention is not limited thereto. The upward arrows in FIG. 2 indicate light emitted from the light unit 500 and/or light emitted from the light guide.

The light unit 500 may include a light source which emits blue light, e.g., a light emitting diode ("LED"). The light source may be an edge type light source disposed at a lateral surface of the light guide (not illustrated), or a direct type light source in which the light source of the light unit 500 is disposed under such as at a rear of the light guide (not shown), but the invention is not limited thereto.

The thin film transistor array panel 100 is disposed between the liquid crystal layer 3 and the light unit 500.

The thin film transistor array panel 100 includes a first polarization layer 12 disposed between a first (base) substrate 110 and the light unit 500. The first polarization layer 12 serves to polarize light introduced to the thin film transistor array panel 100 from the light unit 500.

The first polarization layer 12 may include at least one of an applied polarization layer, a coated polarization layer and a wire grid polarizer. The first polarization layer 12 may be disposed on a side (e.g., rear side or surface) of the first substrate 110 in various forms such as a film form, a coating form, an attachment form, a printing form and the like, but it is not limited thereto.

A pixel is provided in plurality arranged in a matrix shape on the first substrate 110, in the top plan view. The display device may include a red pixel R, a green pixel G and a blue pixel B at which red light, green light and blue light are respectively emitted to display an image. The red, green and blue pixel R, G and B may repeat along the first direction D1, as illustrated in FIG. 1. The pixel may be a minimum unit at which the image is generated and displayed. In an exemplary embodiment the red, green and blue pixel R, G and B may arranged along the second direction D2 such as to respectively dispose the first red, blue and green pixel R, G and B in a same column extended along the second direction D2.

The thin film transistor array panel 100 may include a gate line 121 between the first substrate 110 and the liquid crystal layer 3 to be lengthwise extended in a first direction D1 and including or defining a gate electrode 124, a gate insulating layer 140 disposed between the gate line 121 and the liquid crystal layer 3, a semiconductor layer 154 disposed between the gate insulating layer 140 and the liquid crystal layer 3, a data line 171 disposed between the semiconductor layer 154 and the liquid crystal layer 3 to lengthwise extend in a second direction D2 and be connected to a source electrode 173, a drain electrode 175 spaced apart from the source electrode 173 to define a channel therebetween, and a passivation layer 180 disposed between the data line 171 and the liquid crystal layer 3. Any of the various elements of the thin film transistor array panel 100 may be provided in plurality on the first substrate 110.

The display device and components thereof are disposed in a plane defined by the first and second directions D1 and D2, such as being perpendicular to each other. A top plan view is a view of the plane in a direction normal to the plane defined by the first and second directions D1 and D2. A thickness of the display device and components thereof is defined in a third direction D3 which crosses both the first and second directions D1 and D2, such as being orthogonal thereto, without being limited thereby.

The semiconductor layer 154 forms a channel of a switching element such as a thin film transistor, at a portion of the semiconductor layer 154 that is not covered or overlapped by the source electrode 173 and the drain electrode 175. The gate electrode 124, the semiconductor layer 154, the source electrode 173 and the drain electrode 175, along with a portion of the gate insulating layer 140, constitute one thin film transistor.

A pixel electrode 191 is disposed on the passivation layer 180. The pixel electrode 191 may be physically and/or electrically connected to the drain electrode 175 through and at a contact hole 185 defined in the passivation layer 180. While a single pixel electrode 191 layer is shown in FIG. 2, the pixel electrode 191 may be provided in plurality along the first direction D1 as illustrated in FIG. 1.

A first alignment layer 11 may be disposed between the pixel electrode 191 and the liquid crystal layer 3.

The color conversion display panel 30 includes a second (base) substrate 310 that overlaps the thin film transistor array panel 100. A light blocking member 320 is disposed between the second substrate 310 and the liquid crystal layer 3.

Portions of the light blocking member 320 may be respectively disposed between a first color conversion layer 330R and a second color conversion layer 330G, and between the second color conversion layer 330G and a transmission layer 330B, and between the transmission layer 330B and the first color conversion layer 330R, which will be described later. The light blocking member 320 may have a lattice form in the top plan view. A pixel may be disposed between adjacent portions of the light blocking member 320 having the lattice form. The first color conversion layer 330R, the second color conversion layer 330G and the transmission layer 330B may be respectively disposed at the red, green and blue R, G and B pixels. The first color conversion layer 330R, the second color conversion layer 330G and the transmission layer 330B may be disposed to correspond to a pixel electrode 191 at red, green and blue R, G and B pixels, respectively.

Although the exemplary embodiment in which the light blocking member 320 is disposed in the color conversion display panel 30 has been described in the present specification, the invention is not limited thereto. In an exemplary embodiment, for example, the light blocking member 320 may be disposed in the thin film transistor array panel 100.

A blue light cutting filter 325 may be disposed between the second substrate 310 and the thin film transistor array panel 100. The blue light cutting filter 325 is disposed to overlap light-emitting regions at which red and green light are emitted, respectively, but is not disposed in a light-emitting region at which blue light is emitted. A single one blue light cutting filter 325 may commonly be disposed in both the light-emitting regions at which red and green light are emitted. The blue light cutting filter 325 may have or define an opening that overlaps the light-emitting region at which the blue light is emitted.

The blue light cutting filter 325 may include a first region that overlaps the first color conversion layer 330R and a second region that overlaps the second color conversion layer 330G. In this case, the first region and the second region may be connected with each other such that the blue light cutting filter 325 is commonly disposed at the first and second color conversion layers 330R and 330G. However, the invention is not limited thereto. For example, the first region and the second region of the blue light cutting filter 325 may be separately formed to define individual and discrete blue light cutting filters 325 at the first and second color conversion layers 330R and 330G.

The blue light cutting filter 325 may block or absorb blue light generated and supplied from the light unit 500. The blue light introduced from the light unit 500 and transmitted into the first color conversion layer 330R and the second color conversion layer 330G may be converted into red or green light by semiconductor nanocrystals 331R and 331G within the first color conversion layer 330R and the second color conversion layer 330G, respectively. In this case, some blue light may be output from the first color conversion layer 330R and the second color conversion layer 330G without being converted, and such blue light and the converted red or green light output from the first color conversion layer 330R and the second color conversion layer 330G may be mixed to reduce the color reproducibility. The blue light cutting filter 325 may absorb the blue light outputted from the first color conversion layer 330R and the second color conversion layer 330G without being converted as described above, to reduce or effectively prevent the converted red or green light and the unconverted blue light from being mixed.

The blue light cutting filter 325 may include a material which blocks or absorbs blue light for performing the above-mentioned effects, and may include a yellow color filter as an example. The blue light cutting filter 325 may have a single-layer structure or a stacked structure of a plurality of layers, such as in a thickness direction of the display device.

In the present specification, the exemplary embodiment in which the blue light cutting filter 325 contacts the second substrate 310 has been described. However, the display device according to an exemplary embodiment may further include a buffer layer (not shown) disposed between the blue light cutting filter 325 and the second substrate 310 without being limited thereto.

A plurality of individual or discrete color conversion layers (or patterns) 330R and 330G may be disposed between the blue light cutting filter 325 and the liquid crystal layer 3, and the transmission layer 330B may be disposed between the second substrate 310 and the liquid crystal layer 3. The transmission layer 330B and the color conversion layers 330R and 330G may be disposed in a same layer of the color conversion display panel 30 among layers disposed on the second substrate 310. While FIG. 2 shows one group of the first color conversion layer 330R, the second color conversion layer 330G and the transmission layer 330B arranged in a row extended along the first direction D1, the invention is not limited thereto. Taking FIGS. 1 and 2 together, the first color conversion layer 330R, the second color conversion layer 330G and the transmission layer 330B may be repeated along the first direction D1. In an exemplary embodiment the first color conversion layer 330R, the second color conversion layer 330G and the transmission layer 330B may arranged along the second direction D2 such as to respectively dispose the first color conversion layer 330R, the second color conversion layer 330G and the transmission layer 330B in a same column extended along the second direction D2.

The color conversion layers 330R and 330G may serve to convert light incident thereto into light having a different wavelength from that of the incident light, and emit the converted light. The color conversion layers 330R and 330G may include the first color conversion layer 330R and the second color conversion layer 330G. In this case, the first color conversion layer 330R may be a red color conversion layer and the second color conversion layer 330G may be a green color conversion layer.

The transmission layer 330B may emit light incident thereto without color conversion. In an exemplary embodiment, for example, blue light may be introduced to the transmission layer 330B to emit the (non-converted) blue light therefrom.

The first color conversion layer 330R may include a first semiconductor nanocrystal 331R that converts blue light incident thereto into red light. The first semiconductor nanocrystal 331R may include at least one of a phosphor and a quantum dot.

The second color conversion layer 330G may include a second semiconductor nanocrystal 331G that converts blue light incident thereto into green light. The second semiconductor nanocrystal 331G may include at least one of a phosphor and a quantum dot.

In this case, the quantum dot can be selected from a group II-VI compound, a group III-V compound, a group IV-VI compound, a group IV element, a group IV compound and a combination thereof.

For the group II-VI compound, a binary compound selected from CdSe, CdTe, ZnS, ZnSe, ZnTe, ZnO, HgS, HgSe, HgTe, MgSe, MgS, and a combination thereof; a ternary compound selected from CdSeS, CdSeTe, CdالسTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; or a quaternary compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof, may be employed. For the group III-V compound, a binary compound selected from GaN, GaP, GaAs, GaSb, AlN, AlP, AlAs, AlSb, InN, InP, InAs, InSb, and a combination thereof; a ternary compound selected from GaNP, GaNAs, GaNSb, GaPAs, GaPSb, AlNP, AlNAs, AlNSb, AlPAs, AlPSb, InNP, InNAs, InNSb, InPAs, InPSb, and a combination thereof; or a quaternary compound selected from GaAlNAs, GaAlNSb, GaAlPAs, GaAlPSb, GaInNP, GaInNAs, GaInNSb, GaInPAs, GaInPSb, GaAlNP, InAlNP, InAlNAs, InAlNSb, InAlPAs, InAlPSb, and a combination thereof, may be employed. For the group IV-VI compound, a binary compound selected from SnS, SnSe, SnTe, PbS, PbSe, PbTe, and a combination thereof; a ternary compound selected from SnSeS, SnSeTe, SnSTe, PbSeS, PbSeTe, PbSTe, SnPbS, SnPbSe, SnPbTe, and a combination thereof; or a quaternary compound selected from SnPbSSe, SnPbSeTe, SnPbSTe, and a combination thereof, may be employed. For the IV group element, Si, Ge, or a combination thereof may be selected. For the IV group compound, a binary compound selected from SiC, SiGe, and a combination thereof may be employed.

In this case, the binary compound, the ternary compound, or the quaternary compound may exist in a uniform concentration or in a partially different concentration in particles. The quantum dot may include multiple quantum dots, and the quantum dots may have a core/shell structure in which one quantum dot surrounds another quantum dot. An interface between a core and a shell may have a concentration gradient such that a concentration of an element in the shell decreases toward a center thereof.

The quantum dot may have a full width at half maximum ("FWHM") of the light-emitting wavelength spectrum that is equal to or less than about 45 nanometers (nm). In an exemplary embodiment, the FWHM of the light-emitting wavelength spectrum is equal to or less than about 40 nm. In another exemplary embodiment, the FWHM of the light-emitting wavelength spectrum is equal to or less than about 30 nm. In this range of the light-emitting wavelength spectrum, color purity or color reproducibility may be improved. In addition, since light emitted through the quantum dot is emitted in all directions, a viewing angle of light for the display device may be improved.

The quantum dot is not specifically limited to have shapes that are generally used in the technical field related to the present disclosure, and more specifically, may have a shape such as a nano-particle having a spherical shape, a pyramid shape, a multi-arm shape or a cubic shape, or may be a nanotube, a nanowire, a nanofiber, a planar nano-particle, etc.

When the first semiconductor nanocrystal 331R includes a red phosphor, the red phosphor may include at least one of (Ca, Sr, Ba)S, (Ca, Sr, Ba)$_2$Si$_5$N$_8$, CaAlSiN$_3$, CaMoa$_4$, and Eu$_2$Si$_5$N$_8$, but is not limited thereto.

When the second semiconductor nanocrystal 331G includes a green phosphor, the green phosphor may include at least one of yttrium aluminum garnet (YAG), (Ca, Sr, Ba)$_2$SiO$_4$, SrGa$_2$S$_4$, barium magnesium aluminate (BAM), α-SiAlON, β-SiAlON, Ca$_3$Sc$_2$Si$_3$O$_{12}$, Tb$_3$Al$_5$O$_{12}$, BaSiO$_4$, CaAlSiON, and $(Sr_{1-x}Ba_x)Si_2O_2N_2$. In this case, the x may be a number between 0 and 1.

The transmission layer 330B may include a resin that transmits blue light incident thereto. The transmission layer 330B positioned in a light-emitting region at which blue light is emitted, emits incident blue light without conversion since the transmission layer 330B omits a separate phosphor or quantum dot for converting a wavelength of the light incident thereto.

Although not illustrated in the present specification, the transmission layer 330B may further include at least one of a dye and a pigment according to an exemplary embodiment. The transmission layer 330B including the dye and the pigment may output blue light with improved color purity while reducing external light reflection.

The first color conversion layer 330R, the second color conversion layer 330G and the transmission layer 330B may include a photosensitive resin as a base material as an example. In an exemplary embodiment of manufacturing a display device, a light-emitting layer including each of the first color conversion layer 330R, the second color conversion layer 330G and the transmission layer 330B on the second substrate 310 may be manufactured by a photolithography process. Alternatively, the first color conversion layer 330R, the second color conversion layer 330G and the transmission layer 330B may be manufactured by a printing process. When manufactured by the printing process, the first color conversion layer 330R, the second color conversion layer 330G and the transmission layer 330B may include materials other than the photosensitive resin. For an exemplary embodiment of manufacturing a display device, the present specification illustrates that a collective layer including the color conversion layer, the transmissive layer and the light blocking layer are formed by the photolithography process or the printing process, but the present disclosure is not limited thereto.

At least one of the first color conversion layer 330R, the second color conversion layer 330G, and the transmission layer 330B may further include a light scattering member such as a scatter 335 provided in plurality. As an example, each of the first color conversion layer 330R, the second color conversion layer 330G and the transmission layer 330B may have the scatterers 335. Alternatively, only the transmission layer 330B may include the scatterers 335, and the first color conversion layer 330R and the second color conversion layer 330G may not include the scatterers 335. Various other exemplary embodiments may be possible. A content (e.g., material, quantity, arrangement, etc.) of the scatterers included in each of the first color conversion layer 330R, the second color conversion layer 330G and the transmission layer 330B may be different.

The scatterers 335 may include a material which provides uniform scattering of light incident thereto. The scatterers 335 may include at least one of $TiO_2$, $ZrO_2$, $Al_2O_3$, $In_2O_3$, ZnO, $SnO_2$, $Sb_2O_3$ and ITO, for example.

An optical filter layer 340 may be disposed between the color conversion layers 330R and 330G and the liquid crystal layer 3, and may be disposed between the transmission layer 330B and the liquid crystal layer 3. The optical filter layer 340 may overlap a front surface of the second substrate 310. The optical filter layer 340 may extend to be commonly disposed on each of the color conversion layers 330R and 330G and the transmission layer 330B. The optical filter layer 340 may be omitted depending on an exemplary embodiment.

In an exemplary embodiment of manufacturing a display device, the optical filter layer 340 may serve to reduce or effectively prevent damage to and extinction of the semiconductor nanocrystals 331R and 331G included in the first color conversion layer 330R and the second color conversion layer 330G during a relatively high-temperature processes performed after the first color conversion layer 330R, the second color conversion layer 330G and the transmission layer 330B are formed.

The optical filter layer 340 may serve as a filter that reflects or absorbs light other than light having a specific wavelength, while at the same time transmitting the light having the specific wavelength. The optical filter layer 340 may have a structure in which a layer having a high refractive index and a layer having a low refractive index are alternately stacked in the third direction to form about 10 to about 20 layers within the overall optical filter layer 340. That is, the optical filter layer 340 may have a structure in which a plurality of layers having different refractive indexes from each other, are stacked. To that end, the optical filter layer 340 utilizes a principle of transmitting and/or reflecting light having a specific wavelength using reinforcement and/or destructive interference between an inorganic layer having a high refractive index and an inorganic layer having a low refractive index.

The optical filter layer 340 may include at least one of TiO2, SiNx, SiOy, TiN, AlN, Al2O3, SnO2, WO3 and ZrO2. In an exemplary embodiment, for example, the optical filter layer 340 may have a structure in which SiNx and SiOy are alternately stacked. In SiNx and SiOy, x and y determine a chemical composition ratio, and can be controlled depending on process conditions for forming a layer.

An overcoat layer 350 may be disposed between the optical filter layer 340 and the liquid crystal layer 3. The overcoat layer 350 may overlap a front surface of the second substrate 310. The overcoat layer 350 is extended to be commonly disposed on each of the color conversion layers 330R and 330G and the transmission layer 330B.

The overcoat layer 350 may serve to planarize the non-planar underlying layers of the color conversion display panel 30, such as to provide a planar (e.g., flat) surface at each of the first color conversion layer 330R, the second color conversion layer 330G and the transmission layer 330B. The overcoat layer 350 may include an organic material, but is not limited thereto, and any of a number of materials capable of performing a planarization function may be used for the overcoat layer 350.

The first color conversion layer 330R, the second color conversion layer 330G and the transmission layer 330B may be separately disposed such as to be spaced apart from each other. Accordingly, a valley V is respectively formed between a first color conversion layer 330R and the second color conversion layer 330G adjacent to each other, between the second color conversion layer 330G and the transmission layer 330B adjacent to each other, and between the transmission layer 330B and a second first color conversion layer 330R adjacent to each other. The valley V may correspond to an area between pixels adjacent to each other, such as at the gate line 121 and the data line 171, but not being limited thereto. Since the color conversion and transmission layers are discrete patterns separated from each other in both the first and second directions D1 and D2, the valleys V may lengthwise extend in the first direction D1 and/or the second direction D2.

The first overcoat layer 350 serves to planarize the first color conversion layer 330R, the second color conversion layer 330G and the transmission layer 330B which face the thin film transistor array panel 100, and the valleys V therebetween. Each of the first color conversion layer 330R, the second color conversion layer 330G and the transmission layer 330B may have a height (e.g., thickness) of several micrometers (μm) in the third direction D3. The height may be a maximum height of the respective layer, in the third direction D3. In an exemplary embodiment of manufacturing a display device, when the first overcoat layer 350 is formed on the layers, completely planarizing the first color conversion layer 330R, the second color conversion layer 330G the transmission layer 330B, and the valleys V therebetween, may be difficult. In planarizing the underlying layers, the first overcoat layer 350 may include a step S as shown in FIG. 2.

A height h1 of the first overcoat layer 350 at the step S thereof, may be equal to or greater than about 40 nm. The step S of the first overcoat layer 340 may be positioned to overlap or correspond to a valley V.

An imprint resin layer 352 is disposed between the first overcoat layer 350 and the liquid crystal layer 3. The imprint resin layer 352 may include a resin that can be used for a nanoimprint process during manufacturing of the display device, without limitation. In an exemplary embodiment, for example, the imprint resin layer 352 may include a photo-curing resin such as an ultraviolet ("UV") curable resin.

A surface of the imprint resin layer 352 facing the second substrate 310 may fill the step S of the first overcoat layer 350, so as to have a shape corresponding to the step S.

As described above, since the thickness of the color conversion layers 330R and 330G and the transmission layer 330B is several micrometers, in a process of forming the first overcoat layer 350, the first overcoat layer 350 may have the step S of a height of at least of 40 nm.

In an exemplary embodiment of manufacturing a display device, the imprint resin layer 352 may be formed by applying an imprint resin material onto the first overcoat layer 350 defining the step S, and pressing the imprint resin thereto such as with an imprint template. The imprint resin may be pressed to fill the step S in a step of applying pressure to the imprint resin. When simply applying and curing the resin without applying pressure thereto, completely filling the step S may be difficult.

As shown in FIG. 3, a surface of the imprint resin layer 352 facing the thin film transistor array panel 100 may have unevenness (e.g., be non-planar). The aforementioned imprint template may have unevenness, and a surface of the imprint resin layer 352 formed by applying pressure to the imprint template may have unevenness.

The unevenness may be in a form in which a plurality of concave portions 325a and convex portions 325b are alternately disposed. Each of the concave portions 325a and the convex portions 325b having the unevenness may have a bar-like shape that lengthwise extends in the first direction D1.

The unevenness has a shape that is defined by the concave portions 325a and the convex portions 325b repeated along the second direction D2. In other words, as shown in FIG. 3, the concave portions 325a and the convex portions 325b may be alternately disposed along the second direction D2 to form the uneven surface of the imprint resin layer 352. Each of the concave portions 325a and the convex portions 325b which has the bar-like shape that lengthwise extends in the first direction D1, may lengthwise extend orthogonal to the valleys V lengthwise extending in the second direction D2 and the data line 171 lengthwise extending in the second direction D2 (refer to FIG. 1).

According to the present exemplary embodiment, the first color conversion layer 330R, a first valley V, the second color conversion layer 330G, a second valley V, the transmission layer 330B and a third valley V may be repeatedly disposed in the first direction D1. In this case, a portion of the valleys V may have a shape that lengthwise extends along the second direction D2, and the unevenness formed in the imprint resin layer 352 may have a shape that is repeated along the second direction D2. For a portion of the valleys V having a shape that lengthwise extends along the first direction D1, a surface of the imprint resin layer 352 which faces the thin film transistor panel 100 may have an even or planar shape along the first direction D1.

In an exemplary embodiment of manufacturing a display device, the imprint template is pressurized along the second direction D2 which is perpendicular to the first direction D1, in order to form the imprint resin layer 352 having such an uneven pattern along the second direction D2. Accordingly, the imprint resin may be easily filled into the valleys V which lengthwise extend in the second direction D2 to control voids generated due to incomplete filling of the imprint resin at the steps S corresponding to the valleys V. In contrast, with the imprint template being pressurized along the second direction D2, when the unevenness formed in the imprint resin layer 352 includes concave portions and convex portions in parallel with the valleys V which lengthwise extend in the first direction D1 while having a shape that is repeated along the first direction D1, voids remain while some spaces of the valleys V are unfilled in a step of applying pressure to the imprint resin along the second direction.

The unevenness may be repeated with a period or pitch of 200 nm or less. A sum of a width of one concave portion 325a and a width of one convex portion 325b may define the pitch to be about 200 nm, and the concave portion 325a and the convex portion 325b may be repeated.

The convex portion 325b of the unevenness may have a distal surface which faces the thin film transistor array panel 100, and a plurality of distal surfaces included in the convex portions 325b are coplanar with each other to form substantially a same (single) surface. Accordingly, in the imprint resin layer 352, the collectively distal surface which faces the thin film transistor array panel 100 may provide a substantially flat surface.

The imprint resin layer 352 may have a first region R1 that overlaps the first color conversion layer 330R, the second color conversion layer 330G and the transmission layer 330B, and a second region R2 that overlaps the valley V. In addition, the imprint resin layer 352 may have a base portion 325B from which the convex portions 325b are protruding to collectively form a pattern portion 325P with the concave portions 325a. The pattern portion 325P is connected with the base portion 325B. Portions of the base portion 325B may extend to define the convex portions 325b. The base portion 325B may be a thickness portion of the imprint resin layer 352 except for the convex portions 325b.

As shown in FIG. 3, with respect a virtual line common to each of the convex portions 325b, the base portion 325B positioned in the first region R1 and the base portion 325B positioned in the second region R2 may have different thicknesses in the third direction D3. The second region R2 of the imprint resin layer 325 that overlaps the valley V may overlap the step S formed in the first overcoat layer 350. A thickness $h_{B2}$ of the base portion 325B overlapping the step S may be greater than a thickness $h_{B1}$ of the base portion 325B disposed at the color conversion and transmission layers (e.g., flat first region R1).

A height difference between the concave portion 325a and the convex portion 325b of the pattern portion 325P disposed in the first region R1 and in the second region R2 may be substantially the same. In an exemplary embodiment, for example, a height $h_p$ of the pattern portion 325P, which is the height difference between the imprint resin layer 325 at the concave portion 325a and at the convex portion 325b, may be about 100 nm or less, but it is not limited thereto, and may be modified depending on an exemplary embodiment. The pattern portion 325P formed using the imprint template may include a plurality of patterns, which have a same height as each other across an entirety of the imprint resin layer 325, regardless of a thickness of the base portion 325B. Thus, distal end surfaces of the pattern portions 325P disposed in a same plane as each other may form a substantially same single surface of the imprint resin layer 325.

A second overcoat layer 360 is disposed between the imprint resin layer 352 and the liquid crystal layer 3. The second overcoat layer 360 may overlap a front surface of the second substrate 310 (e.g., a surface facing the thin film transistor substrate 100).

The second overcoat layer 360 may include a material that facilitates adhesion between the imprint resin layer 352 and a second polarization layer 22 to be described later, and may include an inorganic material depending on an exemplary embodiment.

The second overcoat layer 360 may include a step having a height of less than about 40 nm or may include substantially no step. The height of the step of the second overcoat layer 360 may be taken as a maximum distance between the second overcoat layer 360 and the second polarization layer 22. The first overcoat layer 350 includes portions which define a height of a step S of about 40 nm or more, but when the imprint resin layer 352 is disposed on and in steps S of the first overcoat layer 350, the step of the first overcoat layer 350 may be almost removed. Accordingly, the second overcoat layer 360 disposed on the single surface of the imprint resin layer 352 formed by the distal end surfaces of the convex portions 352b thereof, may include substantially no step, such as by including a step having a height of less than about 40 nm.

The second polarization layer 22 may be disposed between the second overcoat layer 360 and the liquid crystal layer 3. For the second polarization layer 22, one or more of an applied polarization layer, a coated polarization layer and a wire grid polarizer may be used. As one example, the second polarization layer 22 may be a metal pattern wire grid polarizer. The second polarization layer 22 may be positioned between the overcoat layer 350 and the liquid crystal layer 3 in various forms such as a film form, a coating form, an attachment form, a printing form and the like.

When the second polarization layer 22 is the wire grid polarizer, a plurality of bars forming the wire grid of the second polarization layer 22 having a width of several nanometers. As illustrated in FIG. 2, the width of a bar may be taken in the first direction D1, while a length may be taken in the second direction D2.

Where the second overcoat layer 360 does not have a flat surface facing the thin film transistor array panel 100, these bars may be provided in an irregular or broken form. However, according to one or more an exemplary embodiment, in the case of including the imprint resin layer 352 on the first overcoat layer 350, the second overcoat layer 360 may provide a flat surface having a step difference of about 40 nm or less on which the bar are disposed. Accordingly, the second polarization layer 22 disposed or formed on the essentially flat surface of the second overcoat layer 360 may advantageously have a regular and repeated bar shape. With the regular and repeated bar shape of the second polarization layer 22, reliability of the display device having the aforementioned elements may be improved.

An insulating layer 362, a common electrode 370, and a second alignment layer 21 are sequentially disposed between the second polarization layer 22 and the liquid crystal layer.

The insulating layer 362 serves to insulate the second polarization layer 22 including or made of a metal material, from the common electrode 370. The insulating layer 362 may be omitted when the second polarization layer 22 does not include or is not made of a metal material. The common electrode 370 receiving a common voltage may form an electric field together with the aforementioned pixel electrode 191 to control transmittance of light at the liquid crystal layer 3.

The liquid crystal layer 3 is disposed between the thin film transistor array panel 100 and the color conversion display panel 30 to control transmittance of light therethrough for displaying the image. The liquid crystal layer 3 may have a plurality of liquid crystal molecules 31, and movement of the liquid crystal molecules 31 is controlled by an electric field generated between the pixel electrode 191 and the common electrode 370. Images may be displayed by controlling transmittance of light received from the light unit 500 depending on a movement degree of the liquid crystal molecules 31.

With the aforementioned display device, although the color conversion layer and the transmission layer included in the color conversion display panel have predetermined steps to form a non-planar surface thereof, a more planarized surface having smaller steps may be provided by the imprint resin layer disposed on the non-planar surface. When an additional overcoat layer is further included on the imprint resin layer, the additional overcoat layer may be provided to have a substantially planarized surface as including a step of less than about 40 nm.

Therefore, patterning of a polarization layer material disposed on the imprint resin layer may be facilitated, and a regular and repetitive pattern may be provided for the polarization layer, so that reliability of the display device including the same can be improved.

Figure 4:
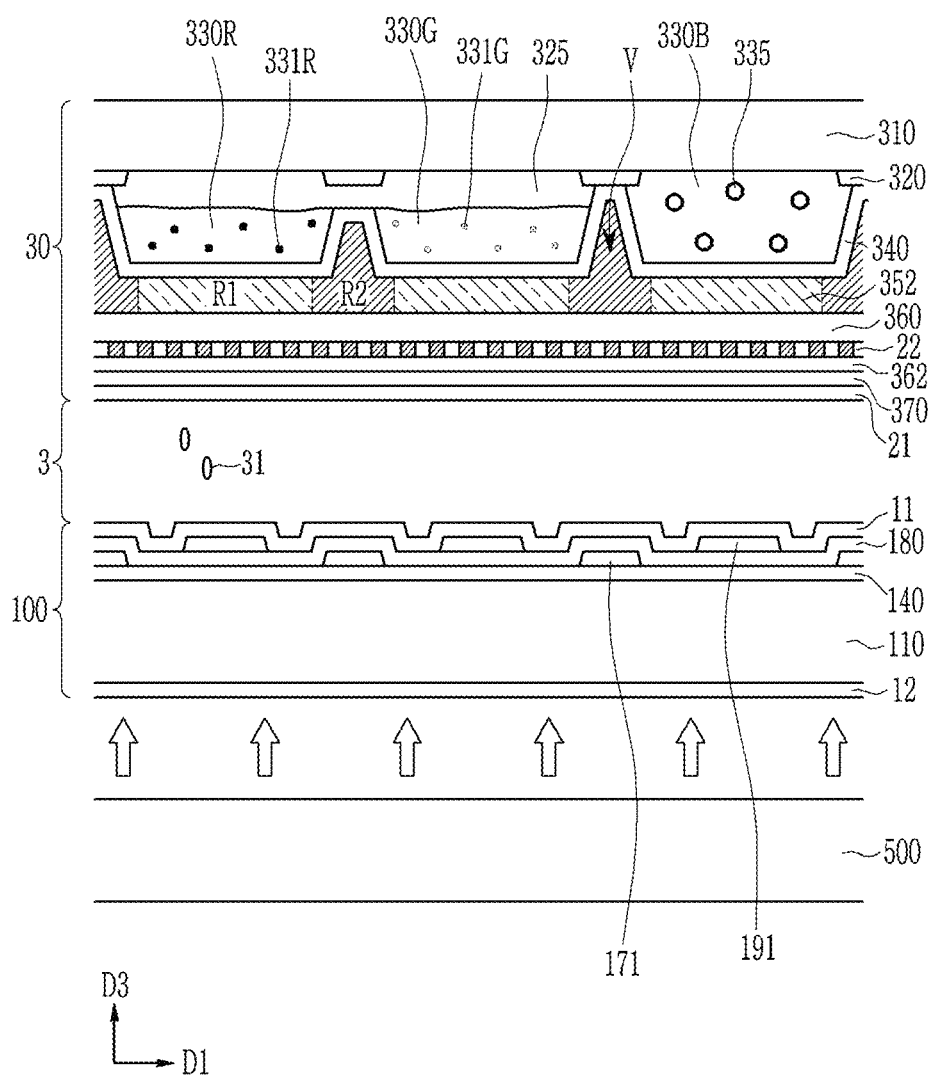
FIG. 4 is a cross-sectional view of a modified exemplary embodiment of the plurality of pixels of FIG. 2 according to the invention.
Figure 5:
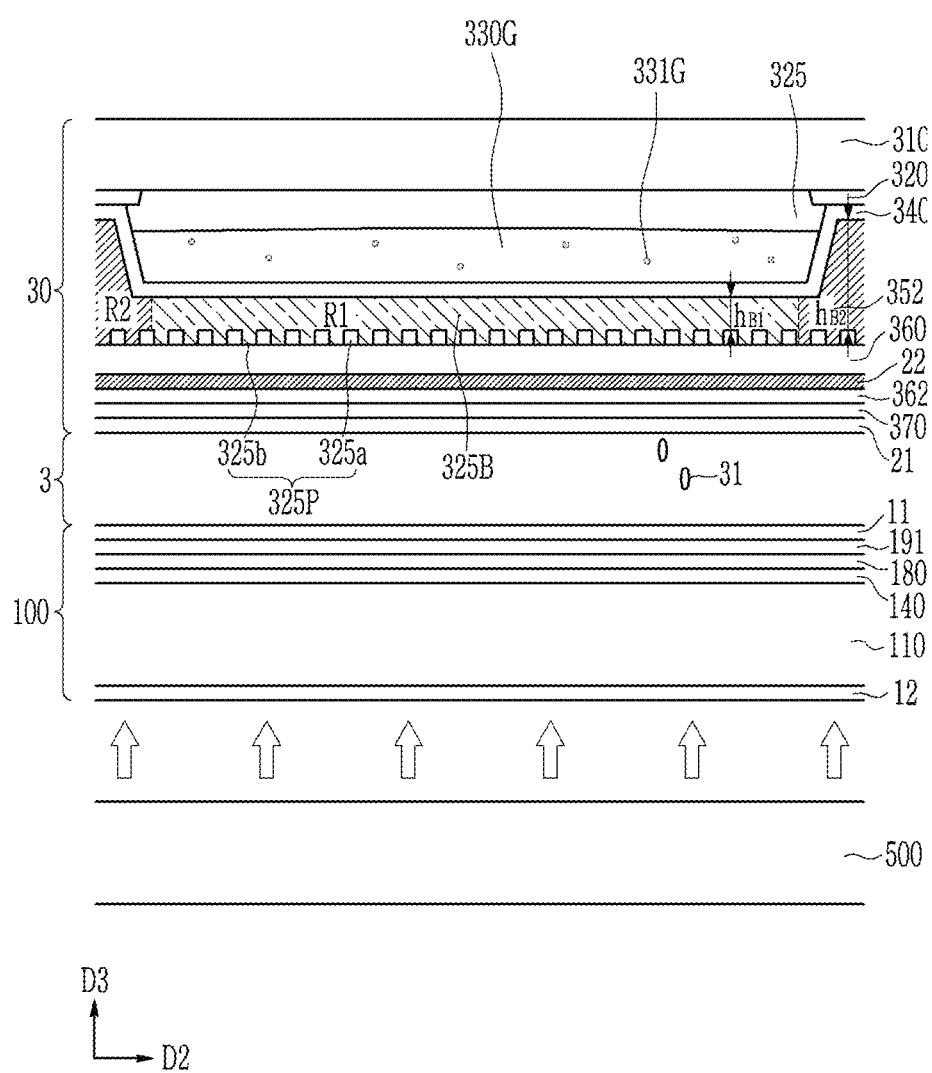
FIG. 5 is a cross-sectional view of a modified exemplary embodiment of the plurality of pixels of FIG. 3 according to the invention.

Hereinafter, a display device according to a modified exemplary embodiment of the invention will be described with reference to FIG. 4 and FIG. 5. FIG. 4 is a cross-sectional view of a modified exemplary embodiment of the plurality of pixels of FIG. 2 according to the invention, and FIG. 5 is a cross-sectional view of a modified exemplary embodiment of the plurality of pixels of FIG. 3 according to the invention. Hereinafter, description related to the same or similar constituent elements as those described above will be omitted.

Referring to FIG. 4 and FIG. 5, the imprint resin layer 352 may be disposed between the optical filter layer 340 and the liquid crystal layer 3. As compared with the exemplary embodiment illustrated in FIG. 1 to FIG. 3, the first overcoat layer 350 may be omitted.

The imprint resin layer 352 may serve to planarize the respective distal surface of the first color conversion layer 330R, the second color conversion layer 330G and the transmission layer 330B, which is furthest from the second substrate 310. Each of the first color conversion layer 330R, the second color conversion layer 330G and the transmission layer 330B may have a height of several micrometers (μm), and a depth of the valleys V therebetween is also several micrometers (μm). The imprint resin layer 352 may be positioned to fill the valleys V between adjacent patterns of the first color conversion layer 330R, the second color conversion layer 330G and the transmission layer 330B.

In an exemplary embodiment of manufacturing a display device, for example, the imprint resin layer 352 may be provided to fill the valleys V between adjacent patterns of the first color conversion layer 330R and the second color conversion layer 330G, between adjacent patterns of the second color conversion layer 330G and the transmission layer 330B, and between adjacent patterns of the transmission layer 330B and the first color conversion layer 330R, by coating the imprint resin material on distal surfaces of each of the first color conversion layer 330R, the second color conversion layer 330G and the transmission layer 330B and applying pressure thereto with the imprint template described above.

As shown in FIG. 4, the imprint resin layer 352 may include a first region R1 that overlaps the first color conversion layer 330R, the second color conversion layer 330G and the transmission layer 330B, and a second region R2 that overlaps the valleys V. In addition, as shown in FIG. 5, the imprint resin layer 352 may include a base portion 325B and a pattern portion 325P which is connected with the base portion 325B to form an uneven distal surface of the imprint resin layer 352.

The base portion 325B positioned in the first region R1 and the base portion 325B positioned in the second region R2 may have different thicknesses. A thickness $h_{B2}$ of the base portion 325B overlapping the valley V may be greater than a thickness $h_{B1}$ of the base portion 325B disposed at the first region R1.

The other configurations are the same as the configurations described with reference to FIG. 1 to FIG. 3, and thus will not be described below.

With the aforementioned display device, although the color conversion layer and the transmission layer included in the color conversion display panel have predetermined steps to form a non-planar surface thereof, a more planarized surface having smaller steps may be provided by the imprint resin layer disposed on the non-planar surface. Since a collection of distal end surfaces of the pattern portions are disposed in a same plane as each other, a substantially the same single surface of the imprint resin layer may be formed. Therefore, patterning of a polarization layer material disposed on the distal surface of the imprint resin layer may be facilitated, and a regular and repetitive pattern may be provided for the polarization layer, so that reliability of the display device including the same can be improved.

Figure 6:
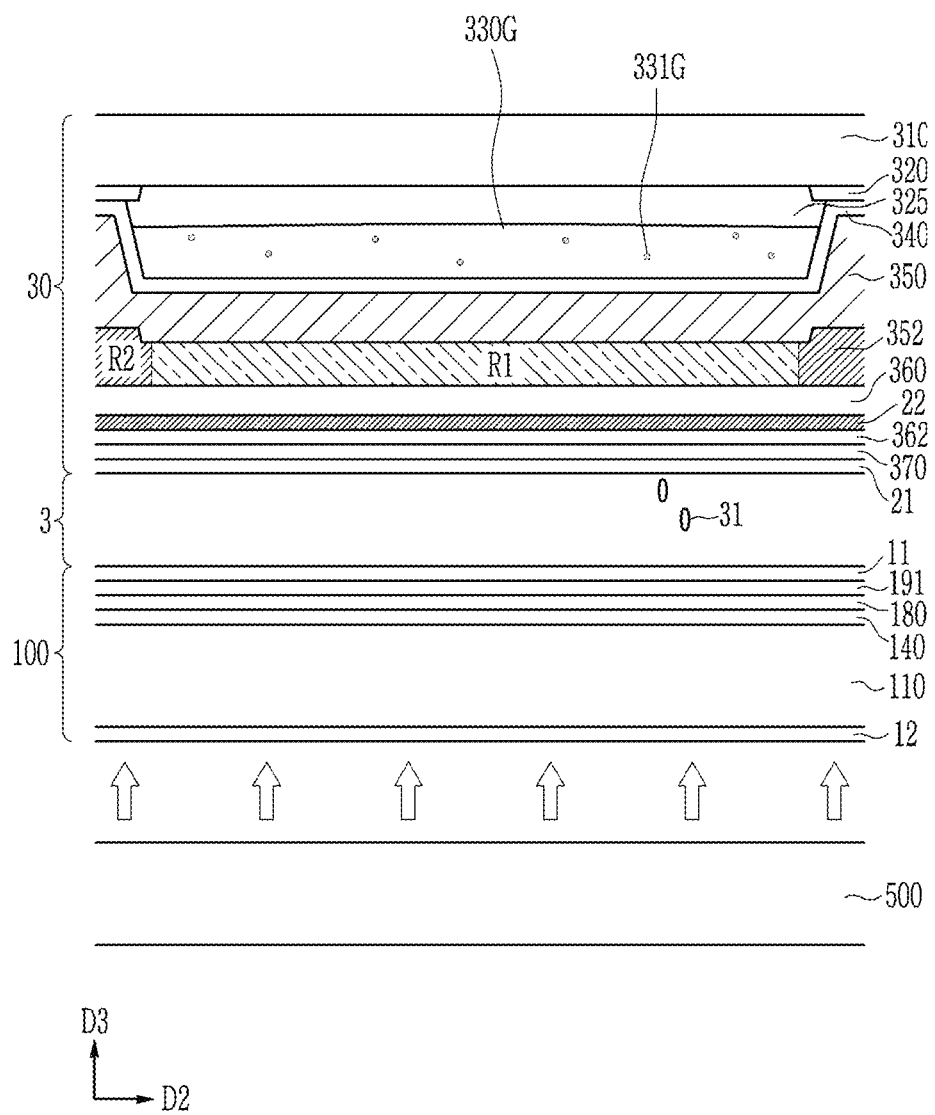
FIG. 6 is a cross-sectional view of another modified exemplary embodiment of the plurality of pixels of FIG. 3 according to the invention.

Hereinafter, a display device according to another modified exemplary embodiment of the invention will be described with reference to FIG. 6. FIG. 6 is a cross-sectional view of another modified exemplary embodiment of the plurality of pixels of FIG. 3 according to the invention. Description related to constituent elements that are identical or similar to the aforementioned constituent elements will be omitted.

According to the exemplary embodiment illustrated in FIG. 6, the imprint resin layer 352 is disposed between the first overcoat layer 350 and the liquid crystal layer 3.

The imprint resin layer 352 may include a flat surface of the thin film transistor array panel 100. Unlike the aforementioned exemplary embodiments, the distal surface of the imprint resin layer 352 which is furthest from the second substrate 310 may have no unevenness, that is, no convex or concave portions arranged in the second direction D2. In this case as well, in the imprint resin layer 352, a surface facing the second substrate 310 may have a shape that fills a step S of the first overcoat layer 350.

As described above, the thickness (e.g., height) of the color conversion layers 330R and 330G and the transmission layer 330B is several micrometers on which the first overcoat layer 350 is formed, and thus the first overcoat layer 350 may have a step at valleys between adjacent patterns of the color conversion layers 330R and 330G and the transmission layer 330B, where a height of the valleys is at least about 40 nm.

The imprint resin layer 352 may be formed by coating the imprint resin material on the first overcoat layer 350 and applying pressure thereto with the imprint template described above. In this case, a template for an imprint to be used may have a simple planar shape at both of opposing surfaces thereof without having a separate uneven shape, such that each of the opposing sides of the imprint resin layer 352 formed using the template may have a planar shape.

The other configurations are the same as the aforementioned configurations, and thus will not be described below.

With the aforementioned display device, although the color conversion layer and the transmission layer included in the color conversion display panel have predetermined steps to form a non-planar surface thereof, a more planarized surface having smaller steps may be provided by the imprint resin layer disposed on the non-planar surface. Therefore, patterning of a polarization layer material disposed on the distal surface of the imprint resin layer may be facilitated, and a regular and repetitive pattern may be provided for the polarization layer, so that reliability of the display device including the same can be improved.

Figure 7:
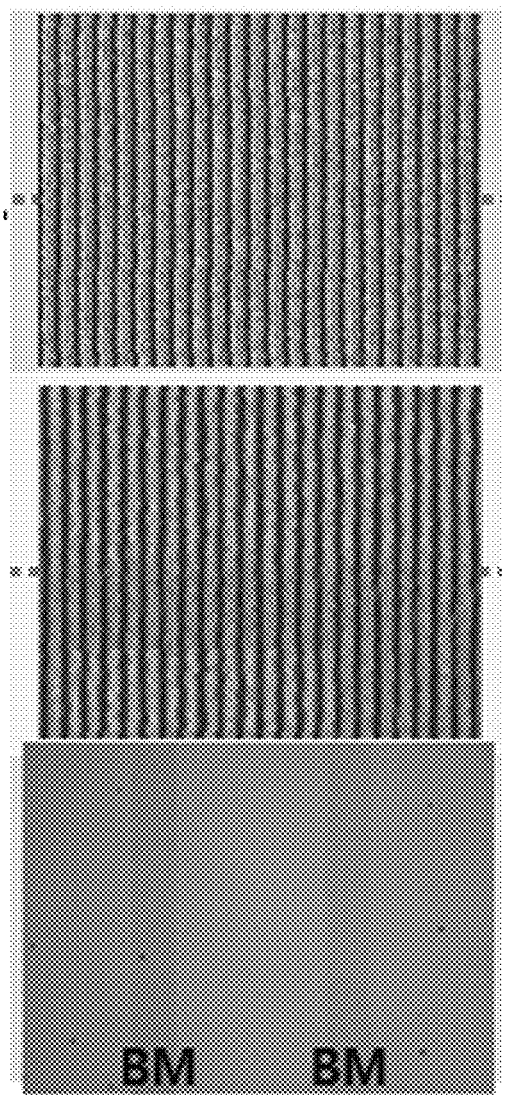
FIG. 7, FIG. 8 and FIG. 9 illustrate (photographic) images of a polarization layer depending on a step height of a first overcoat layer.
Figure 8:
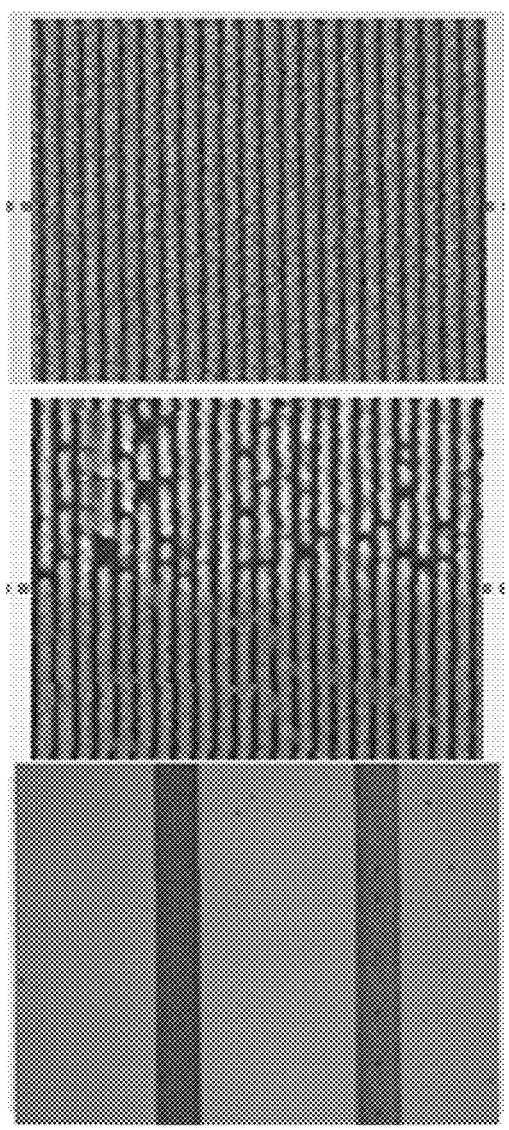
Figure 9:
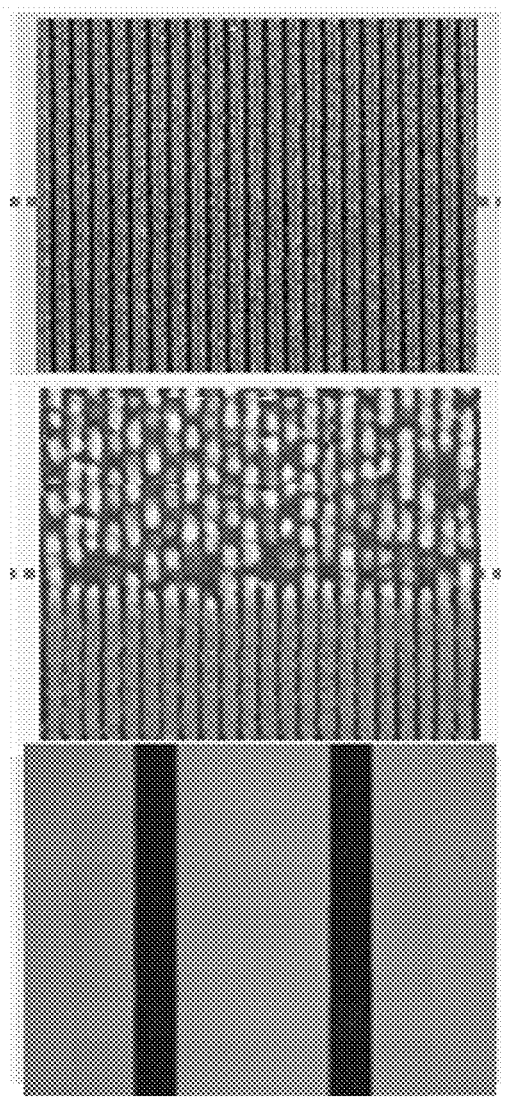

Examples and comparative examples of the invention will now be described with reference to FIG. 7 to FIG. 12. FIG. 7, FIG. 8 and FIG. 9 illustrate images of a polarization layer depending on a step height of a first overcoat layer.

Specifically, FIG. 7 illustrates an image according to an example in which a polarization layer is disposed on an overcoat layer including a step having a height of about 20 nm, FIG. 8 illustrates an image according to a first comparative example in which a polarization layer is disposed on an overcoat layer including a step having a height of about 40 nm, and FIG. 9 illustrates an image according to a second comparative example in which a polarization layer is disposed on an overcoat layer including a step having a height of about 60 nm.

In the case of FIG. 7 in which the step height of the overcoat layer is about 20 nm or less, a wire grid polarizer of the polarization layer has a regular and uniform pattern. In contrast, referring to FIG. 8 and FIG. 9, the pattern of the wire grid polarizer of the polarization layer is disconnected (refer especially to middle image)t and is therefore not stably formed on the overcoat having the step at heights of about 40 nm and 60 nm, thereby deteriorating a function of the polarizer.

Therefore, according to one or more exemplary embodiment of the invention, elements forming the polarization layer can be stably provided when the surface on which the elements are formed has a step with a height of less than 40 nm.

Figure 10:
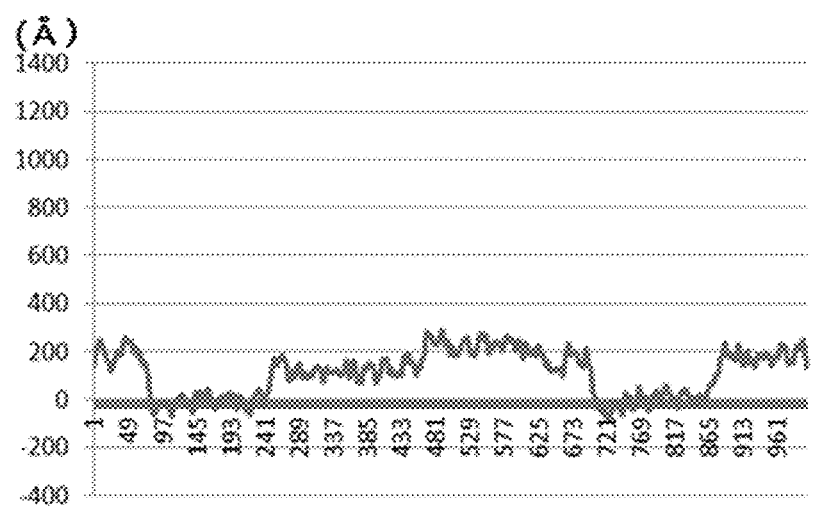
FIG. 10 illustrates a step height of a surface of a color conversion display panel on which a polarization layer is formed, according to the invention.
Figure 11:
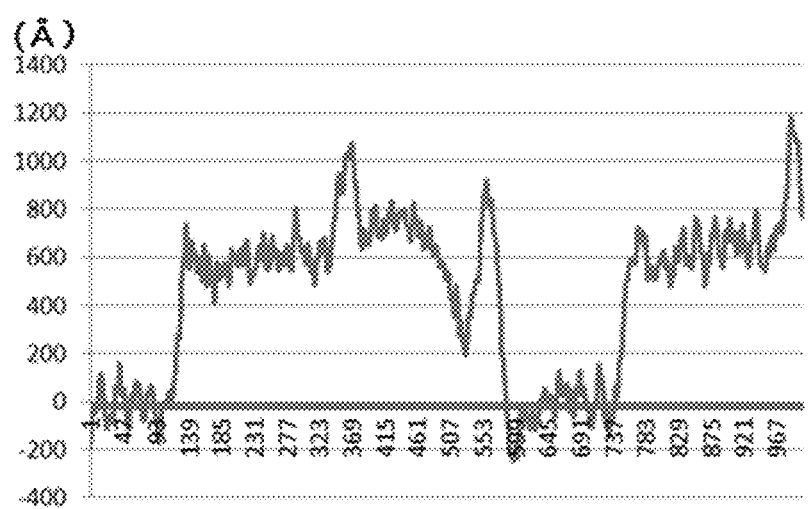
FIG. 11 illustrates a step height of a surface of a color conversion display panel in which a polarization layer is formed according to a comparative example of the invention.

Hereinafter, a degree of a step formed according to an exemplary embodiment of the invention will be described with reference to FIG. 10 and FIG. 11. FIG. 10 illustrates a step height of a color conversion display panel according to an example of the invention, and FIG. 11 illustrates a step height of a color conversion display panel according to a comparative example of the invention. FIG. 10 and FIG. 11 each illustrates the degree (height, Y-axis, in angstroms A) of the step depending on a relative position along the light emitting (conversion and transmission pattern) layer (X-axis).

First, referring to FIG. 10, when an imprint resin layer is formed on an overcoat layer according to an exemplary embodiment, a maximum value of the step of the surface at which a polarization layer is formed, is about 30 nm. In contrast, as shown in FIG. 11, in the case of the comparative example simply including the overcoat layer without including the imprint resin layer, the maximum value of the step of the surface at which a polarization layer is formed, is about 80 nm.

As illustrated in FIG. 7 to FIG. 9, when the step height of the surface at which a polarization layer is formed is 40 nm or more, it is difficult to stably form the polarization layer thereon. According to one or more exemplary embodiment of the invention, the step having a height of about 30 nm or more, for a surface at which a polarization layer is formed, may be provided through a combination of the overcoat layer and the imprint resin layer disposed thereon, and thus the polarization layer may be stably formed on such surface.

Figure 12:
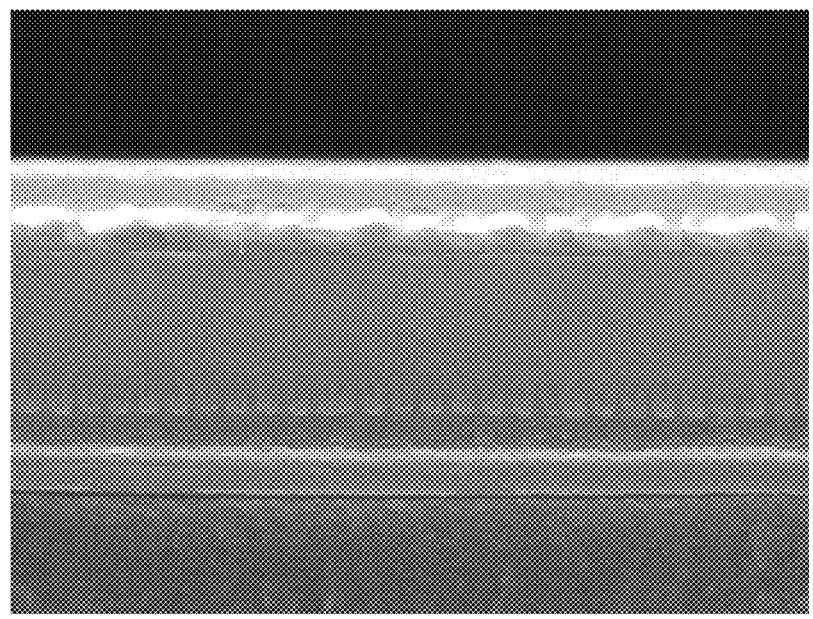
FIG. 12 illustrates a cross-sectional (photographic) image of a portion of a color conversion display panel according to the invention.

FIG. 12 illustrates a cross-sectional image of a portion of a color conversion display panel according to an exemplary embodiment of the invention. Specifically, FIG. 12 illustrates a cross-sectional image of a structure in which a first overcoat layer, an inorganic layer, an imprint resin layer having an uneven surface facing a second polarization layer, a second overcoat layer, a metal layer for the second polarization layer, and a hard mask are stacked.

As shown in FIG. 12, the imprint resin layer has a flat surface of a significantly high level, and is substantially flush with a surface of the uneven surface formed by the imprint resin layer. Therefore, according to one or more exemplary embodiment, when an additional overcoat layer is disposed on the imprint resin layer, the overcoat layer may have one surface of a significantly flat level facing the second polarization layer, and a polarizer formed on the overcoat layer may be stably provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a thin film transistor array panel through which an incident light passes, the thin film transistor array panel including a thin film transistor disposed on a first substrate; and
a color conversion display panel from which wavelength-converted incident light is emitted to display an image, the color conversion display panel including:
a second substrate facing the first substrate; and
between the second substrate and the thin film transistor array panel:
a plurality of color conversion patterns which each wavelength-converts the incident light passed through the thin film transistor array panel;
a polarization layer which polarizes the incident light passed through the thin film transistor array panel, the polarization layer disposed respectively between the thin film transistor array panel and the plurality of color conversion patterns; and
an imprint resin layer disposed respectively between the polarization layer and each of the color conversion patterns, the imprint resin layer defining an uneven surface thereof which is closest to the polarization layer.

2. The display device of claim 1, further comprising a first overcoat layer disposed between the imprint resin layer and each of the color conversion patterns.

3. The display device of claim 2, wherein a surface of the first overcoat layer faces the imprint resin layer, the surface including a step having a height of about 40 nanometers or more.

4. The display device of claim 1, wherein
the uneven surface of the imprint resin layer is defined by a plurality of convex and concave portions alternated with each other, and
distal end surfaces of the convex portions are disposed in a same plane as each other to define a planar surface of the imprint resin layer which is closest to the polarization layer.

5. The display device of claim 1, wherein
the color conversion patterns include a first color conversion pattern and a second color conversion pattern adjacent to each other in a first direction,
a valley is respectively formed between the first color conversion pattern and the second color conversion pattern spaced apart from each other, and
the valley lengthwise extends in a second direction crossing the first direction.

6. The display device of claim 5, wherein the uneven surface of the imprint resin layer is defined by a plurality of convex and concave portions repeatedly alternated with each other in the second direction.

7. The display device of claim 5, wherein
the uneven surface of the imprint resin layer is defined by a plurality of convex and concave portions repeatedly alternated with each other, and
a direction in which the plurality of convex and concave portions are repeatedly alternated with each other is parallel with a direction in which the valley is lengthwise extended.

8. The display device of claim 1, wherein the uneven surface of the imprint resin layer is defined by a plurality of convex and concave portions repeatedly alternated with each other at a pitch of about 200 nanometers or less.

9. The display device of claim 1, further comprising a second overcoat layer disposed between the imprint resin layer and the polarization layer,
wherein the second overcoat layer defines an uneven surface thereof facing the polarization layer, the uneven surface of the second overcoat layer including a step having a height of less than about 40 nanometers.

10. The display device of claim 9, wherein the second overcoat layer includes an inorganic material.

11. The display device of claim 1, wherein the imprint resin layer includes an ultraviolet curable resin.

12. A display device comprising:
a thin film transistor array panel through which an incident light passes, the thin film transistor array panel including a thin film transistor; and
a color conversion display panel from which wavelength-converted incident light is emitted to display an image, the color conversion display panel facing the thin film transistor array panel,
wherein the color conversion display panel includes:
a substrate; and
between the substrate and the thin film transistor array panel:
a color conversion pattern which wavelength-converts the incident light passed through the thin film transistor array panel, and
a transmission pattern which transmits the incident light passed through the thin film transistor array panel, the transmission pattern being spaced apart from the color conversion pattern along the substrate;
a polarization layer which polarizes the incident light passed through the thin film transistor array panel, the polarization layer disposed respectively between the thin film transistor array panel, and each of the color conversion pattern and the transmission pattern; and
an imprint resin layer including an optically curable resin between the polarization layer, and each of the color conversion pattern and the transmission pattern,
wherein the imprint resin layer comprises disposed along the substrate:
a first region overlapping the color conversion pattern and the transmission pattern;
a second region overlapping an area between the color conversion pattern and the transmission pattern which are spaced apart from each other along the substrate,
a base portion disposed in each the first and second regions; and
a pattern portion commonly protruded towards the polarization layer from a same surface of the base portion.

13. The display device of claim 12, wherein
the color conversion pattern and the transmission pattern spaced apart from each other along the substrate to define a valley therebetween, and
the second region of the imprint resin layer overlaps the valley between the color conversion pattern and the transmission pattern which are spaced apart from each other.

14. The display device of claim 13, wherein
a height of the pattern portion from the same surface of the base portion is constant.

15. The display device of claim 14, wherein the height of the pattern portion from the same surface of the base portion is about 100 nanometers or less.

16. The display device of claim 14, wherein a height of the base portion disposed in the first region is smaller than that of the base portion disposed in the second region.

17. The display device of claim 14, wherein distal ends of the pattern portion disposed in the first region and distal ends of the pattern portion disposed in the second region are disposed in a same plane as each other.

18. The display device of claim 12, further comprising a first overcoat layer disposed respectively between the imprint resin layer, and each of the color conversion pattern and the transmission pattern, wherein the first overcoat layer defines an uneven surface thereof facing the polarization layer, the uneven surface of the first overcoat layer including a step having a height of about 40 nanometers.

19. The display device of claim 18, further comprising a second overcoat layer disposed between the imprint resin layer and the polarization layer, wherein the second overcoat layer defines an uneven surface thereof facing the polarization layer, the uneven surface of the second overcoat layer including a step having a height of less than about 40 nanometers.

\* \* \* \* \*